United States Patent
Ryne et al.

(10) Patent No.: US 11,745,787 B2
(45) Date of Patent: Sep. 5, 2023

(54) SYSTEM, METHOD AND APPARATUS FOR RAKE ADJUSTMENT OF A STEERING COLUMN

(71) Applicant: Steering Solutions IP Holding Corporation, Saginaw, MI (US)

(72) Inventors: Patrik Ryne, Lake Orion, MI (US); George E. Arlt, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 50 days.

(21) Appl. No.: 17/036,086

(22) Filed: Sep. 29, 2020

(65) Prior Publication Data
US 2021/0129895 A1    May 6, 2021

Related U.S. Application Data

(60) Provisional application No. 62/930,915, filed on Nov. 5, 2019.

(51) Int. Cl.
*B62D 1/187* (2006.01)
*F16H 53/06* (2006.01)
*B62D 1/181* (2006.01)

(52) U.S. Cl.
CPC ............. *B62D 1/187* (2013.01); *F16H 53/06* (2013.01); *B62D 1/181* (2013.01)

(58) Field of Classification Search
CPC ........ B62D 1/181; B62D 1/187; B62D 1/189; B62D 1/184; B62D 1/16; B62D 1/19; B62D 1/185; F16H 53/06
See application file for complete search history.

(56) References Cited

U.S. PATENT DOCUMENTS

| | | | | |
|---|---|---|---|---|
| 9,393,986 | B1* | 7/2016 | Anspaugh | B62D 1/184 |
| 2004/0023746 | A1* | 2/2004 | Arihara | B62D 1/181 |
| | | | | 475/281 |

(Continued)

FOREIGN PATENT DOCUMENTS

| | | |
|---|---|---|
| CN | 103587571 A | 2/2014 |
| CN | 103889820 A | 6/2014 |

(Continued)

OTHER PUBLICATIONS

Define slot, Microsoft Bing, May 16, 2022 (Year: 2022).*
English translation of First Office Action regarding corresponding CN App. No. 2020112108934; dated Jul. 11, 2022.

*Primary Examiner* — Vinh Luong
(74) *Attorney, Agent, or Firm* — Dickinson Wright PLLC

(57) ABSTRACT

A system for adjusting a rake of a steering column includes a rake actuator. The system also includes a jacket assembly. The system further includes a first bracket operatively coupled to the jacket assembly, the first bracket defining a first slot. The system yet further includes a second bracket defining a second slot, the second bracket fixed in a stationary position relative to the first bracket, the first and second slots oriented at different angles, but partially aligned. The system also includes a cam follower operatively coupled to the rake actuator, the cam follower having an arm extending through the first slot and the second slot, wherein translation of the cam follower adjusts the angular position of the first bracket and the jacket assembly.

8 Claims, 5 Drawing Sheets

(56) References Cited

U.S. PATENT DOCUMENTS

| | | | | |
|---|---|---|---|---|
| 2006/0230863 A1* | 10/2006 | Rouleau | ............... | B62D 1/184 74/492 |
| 2014/0047941 A1* | 2/2014 | Park | ............... | B62D 1/187 74/493 |
| 2015/0135883 A1* | 5/2015 | Nash | ............... | B62D 1/184 29/446 |
| 2017/0259841 A1* | 9/2017 | Anspaugh | ............... | B62D 1/184 |
| 2018/0050720 A1* | 2/2018 | King | ............... | B62D 1/184 |
| 2018/0141582 A1* | 5/2018 | Bodtker | ............... | B62D 1/195 |
| 2018/0170419 A1 | 6/2018 | Blätter et al. | | |
| 2019/0126968 A1* | 5/2019 | Messing | ............... | B62D 1/181 |
| 2019/0382043 A1* | 12/2019 | Dubay | ............... | B62D 1/184 |
| 2020/0031383 A1* | 1/2020 | Ponikiewski | ............... | B62D 1/184 |
| 2021/0024117 A1* | 1/2021 | Higuchi | ............... | B62D 1/184 |
| 2021/0129894 A1* | 5/2021 | Ryne | ............... | B60K 37/06 |
| 2021/0129896 A1* | 5/2021 | Ryne | ............... | B62D 1/187 |
| 2022/0009543 A1* | 1/2022 | Wu | ............... | B62D 1/184 |

FOREIGN PATENT DOCUMENTS

| | | | | |
|---|---|---|---|---|
| CN | 206520645 U | 9/2017 | | |
| DE | 102017200213 A1 | 7/2018 | | |
| DE | 102020128620 B4 * | 9/2021 | ............ | B62D 1/187 |
| EP | 2100796 A2 * | 9/2009 | ............ | B62D 1/184 |

* cited by examiner

SYSTEM, METHOD AND APPARATUS FOR RAKE ADJUSTMENT OF A STEERING COLUMN

CROSS-REFERENCE TO RELATED APPLICATION

This application claims the benefit of priority to U.S. Provisional Patent Application Ser. No. 62/930,915, filed Nov. 5, 2019, the disclosure of which is incorporated by reference herein in its entirety.

BACKGROUND

Conventional steering columns can be electronically adjusted via actuators. Depending on the user requirements, such columns can be adjusted in various directions, including the telescope (i.e., along the axis of the column), rake (i.e., vertically) and/or tilt (i.e., pivot angle) directions.

Conventional rake adjustment can be performed in several ways. For example, FIG. 1 depicts an electrical actuator that is grounded to the underlying structure in a vertical position or close to vertical. The jacket assembly of the steering column is directly pushed up and down around a pivot point that is relatively forward on the column. In another example, FIG. 2 illustrates a pivot bracket installed on one side (or both sides) of the steering column to move the jacket assembly vertically while the actuator pushes or pulls along the axis of the column, or close to it.

Although these solutions are workable they do have limitations. Configuring the actuator in a vertical position or using a pivot bracket with the actuator increases the amount of space required by the steering column assembly. As some end use applications are actually decreasing the space available for steering column assembles, the existing rake adjustment solutions are becoming an issue. Thus, improvements in the rake adjustment of steering columns continue to be of interest.

SUMMARY OF THE INVENTION

According to one aspect of the disclosure, a system for adjusting a rake of a steering column is provided. The system includes a rake actuator. The system also includes a jacket assembly. The system further includes a first bracket operatively coupled to the jacket assembly, the first bracket defining a first slot. The system yet further includes a second bracket defining a second slot, the second bracket fixed in a stationary position relative to the first bracket, the first and second slots oriented at different angles, but partially aligned. The system also includes a cam follower operatively coupled to the rake actuator, the cam follower having an arm extending through the first slot and the second slot, wherein translation of the cam follower adjusts the angular position of the first bracket and the jacket assembly.

According to another aspect of the disclosure, a system for adjusting a rake of a steering column is provided. The system includes a jacket assembly. The system also includes a rake bracket mounted on a longitudinal axis of the steering column, wherein the rake actuator extends in an axial direction that is axially aligned with the longitudinal axis of the steering column.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the various embodiments are shown and described herein, without limiting same, FIGS. 3-7 illustrate embodiments of a system, method and apparatus for rake adjustment of a steering column.

Figure 3:
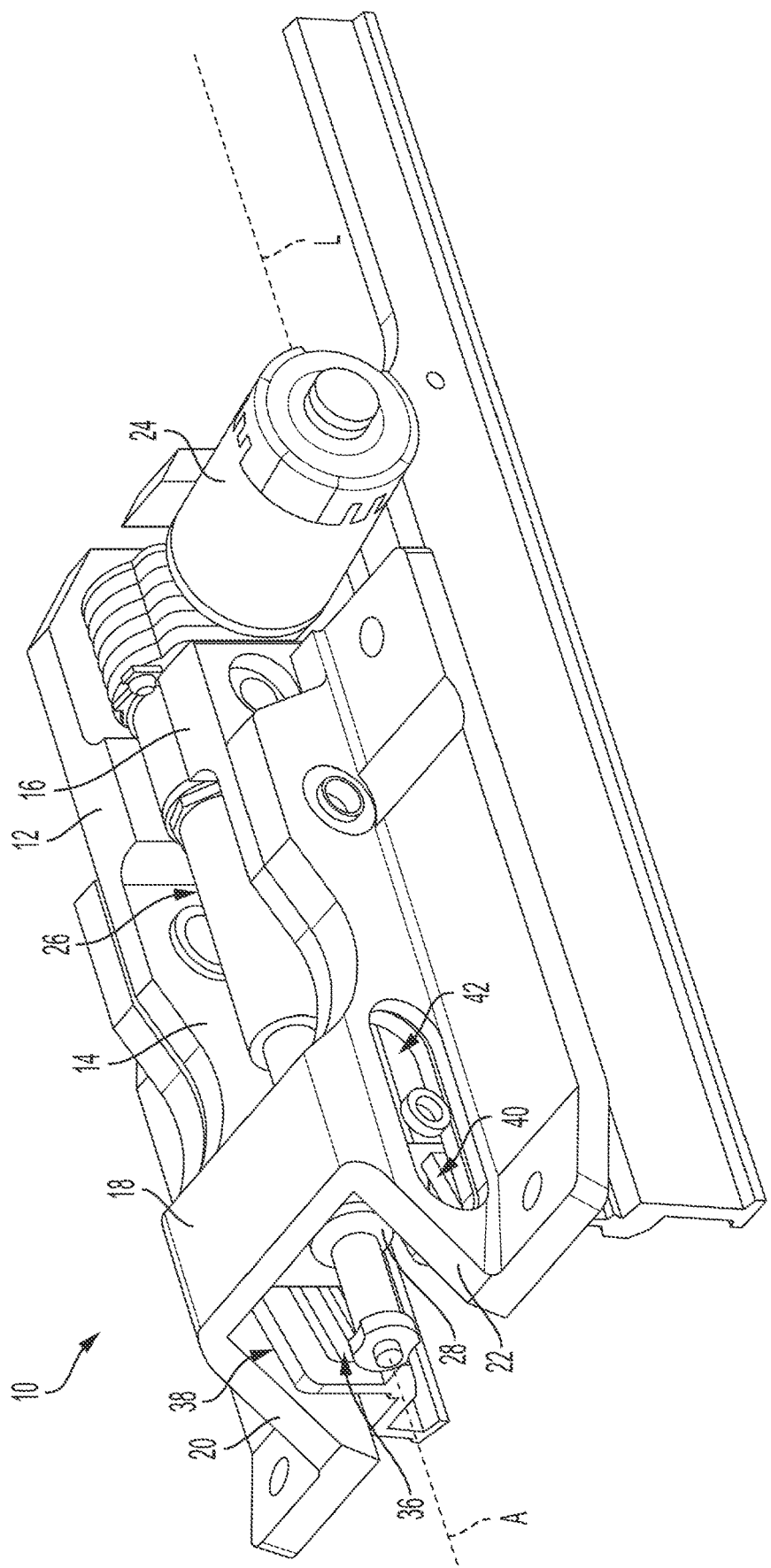
FIG. 3 is an isometric view of one embodiment of rake adjustment mechanism for a steering column.
Figure 6:
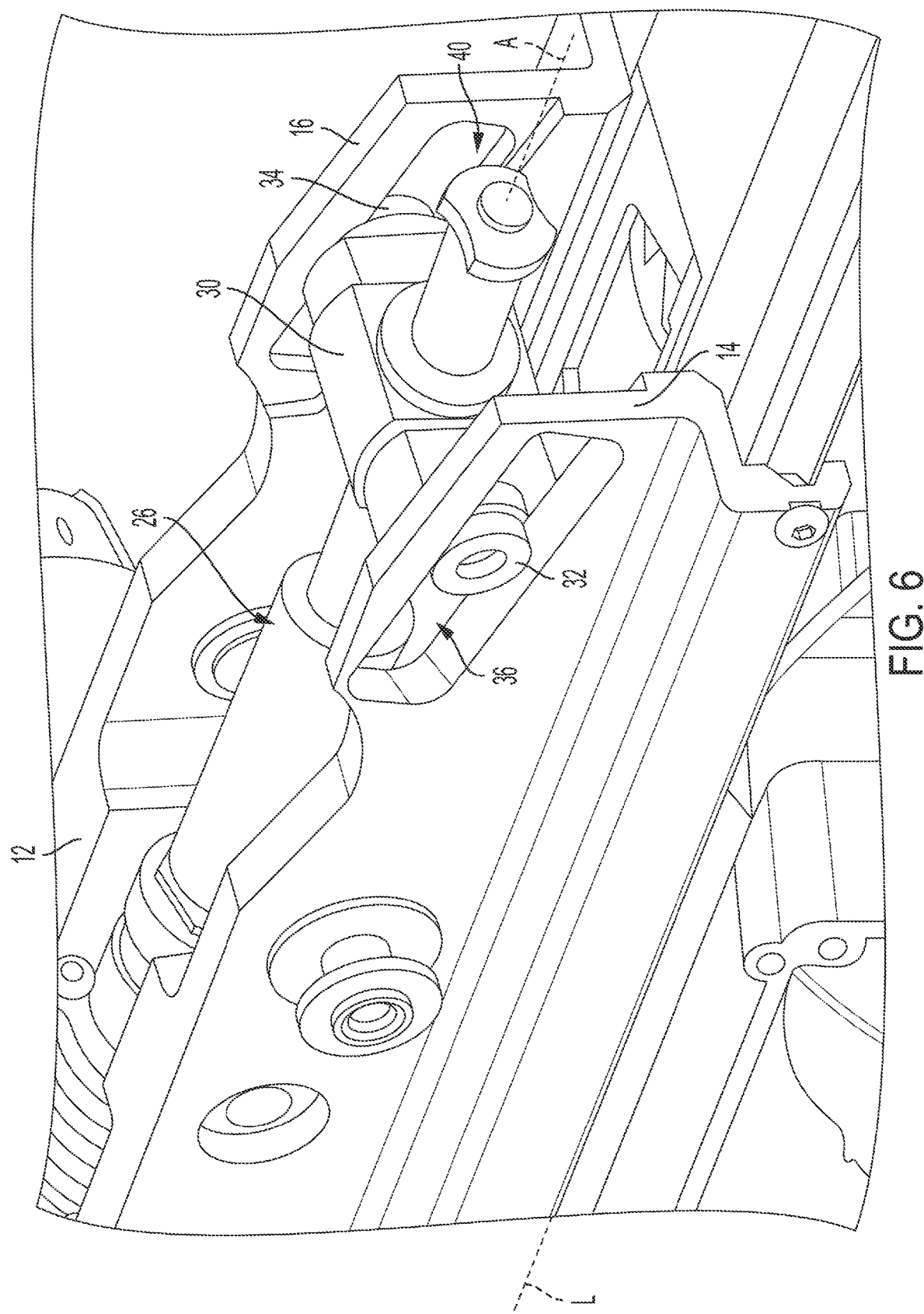
FIG. 6 is a perspective view of an embodiment of the rake adjustment mechanism of FIG. 3.

Referring to FIGS. 3 and 6, a portion of a steering column that is the rake adjustment assembly 10 of the steering column is illustrated. In particular, a first bracket 12 (which may be referred to herein as a compression bracket) is shown with a first side flange 14 and a second side flange 16. The rake adjustment assembly 10 also includes a second bracket 18 (which may be referred to herein as a rake bracket). The second bracket includes a first side arm 20 and a second side arm 22. The first side flange 14 and the first side arm 20 are located on one side of a rake actuator axis A, and the second side flange 16 and second side arm 22 are located on an opposite side of the rake actuator axis A. The rake actuator axis A is oriented substantially parallel to a longitudinal axis L of the steering column assembly—or jacket assembly. The first and second side arms 20, 22 of the second bracket 18 are disposed outwardly, but close to or in abutment with, the side flanges 14, 16 of the first bracket 12.

An electric motor 24 of the rake adjustment assembly 10 is provided to actuate rake movement of the steering column. The electric motor 24 is operatively coupled to one or more mechanical components that form a rake actuator 26 and extend axially along the rake actuator axis A to connect the electric motor 24 with a cam follower 28. The rake actuator 26 can be located in one of several different positions. The positions can include inside, above or below the jacket assembly of the steering column. In the illustrated version, the rake actuator 26 is shown inside a portion of the jacket assembly, although other compact positions are available, as noted above. The positions can include inside, above or below the jacket assembly of the steering column. In the illustrated version, the rake actuator 26 is shown inside a portion of the jacket assembly, although other compact positions are available, as noted above.

The cam follower 28 includes a body 30 that is connected to the rake actuator 26 and is positioned to move axially along axis A. A first arm 32 and a second arm 34 extend away from the body 30 in opposite directions. In particular, the first arm 32 extends toward the first side flange 14 and the first side arm 20, while the second arm 34 extends toward the second side flange 16 and the second side arm 22. The cam follower 26 may be a single, integrally formed component or may be an assembly of multiple parts.

The first arm 32 of the cam follower 28 extends through a first slot 36 defined by the first side flange 14 of the first bracket 12 and through a second slot 38 defined by the first side arm 20 of the second bracket 18. The second arm 34 of the cam follower 28 extends through a third slot 40 defined by the second side flange 16 of the first bracket 12 and through a fourth slot 42 defined by the second side arm 22 of the second bracket 18. The slots 36, 40 of the first bracket 12 overlap with the slots 38, 42 of the second bracket, but are oriented at different angles. In other words, the first slot 36 and the third slot 40 are parallel to each other and oriented at a first angle, but the second slot 38 and the fourth slot 42 are parallel to each other and oriented at a second angle that is different than the first angle.

Figure 4:
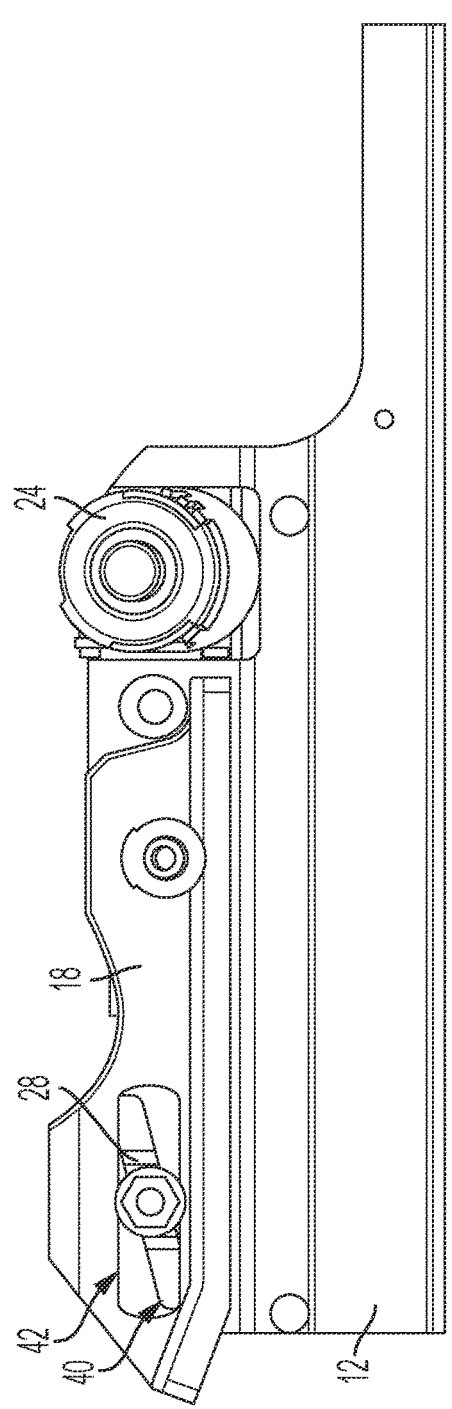
FIG. 4 is a side view of an embodiment of the rake adjustment mechanism of FIG. 3, shown in a first position.
Figure 5:
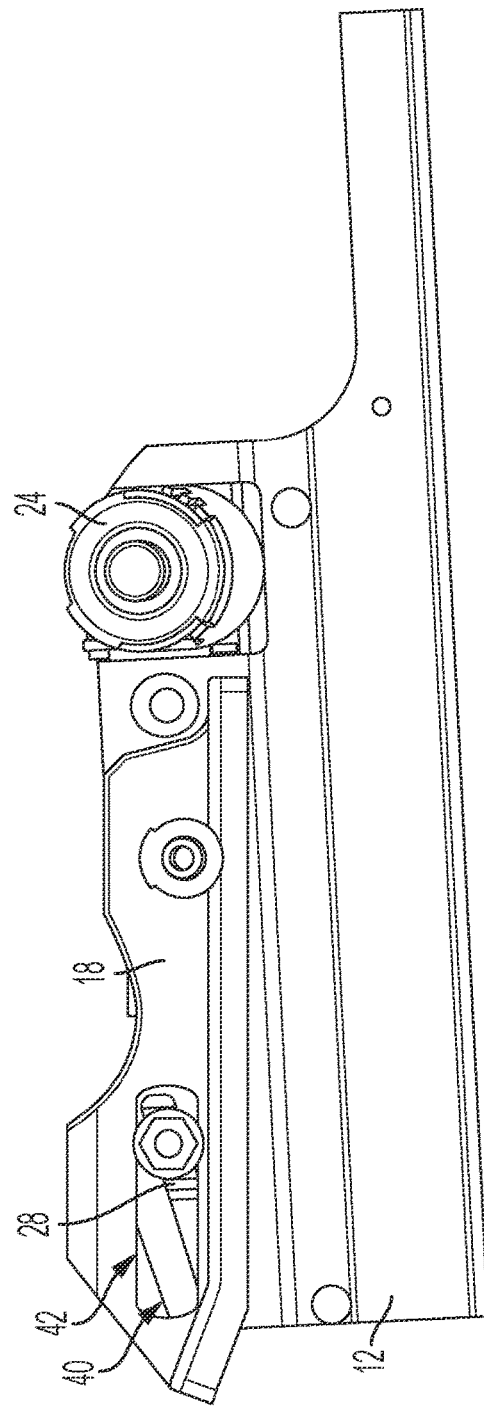
FIG. 5 is a side view of an embodiment of the rake adjustment mechanism of FIG. 3, shown in a second position.

Referring to FIGS. 4 and 5, as the rake actuator 26 actuates along—or approximately along—the axis of the steering column, the rake actuator 26 pushes or pulls the cam follower 28 to modify the position of the first arm 32 and the second arm 34 within the slots 36, 38, 40, 42. The second bracket 18 is fixed in a stationary position relative to the first bracket 12. During the axial movement of the cam follower 28, the first bracket 12 is angularly adjusted relative to the second bracket 18 from a first position (FIG. 4) to a second position (FIG. 5).

The slots 36, 38, 40, 42 can be configured at a desired angle relative to each other. The configuration angle can facilitate the first bracket 12 to be moved up or down a desired extent when the cam follower 28 moves fore and aft.

Figure 1:
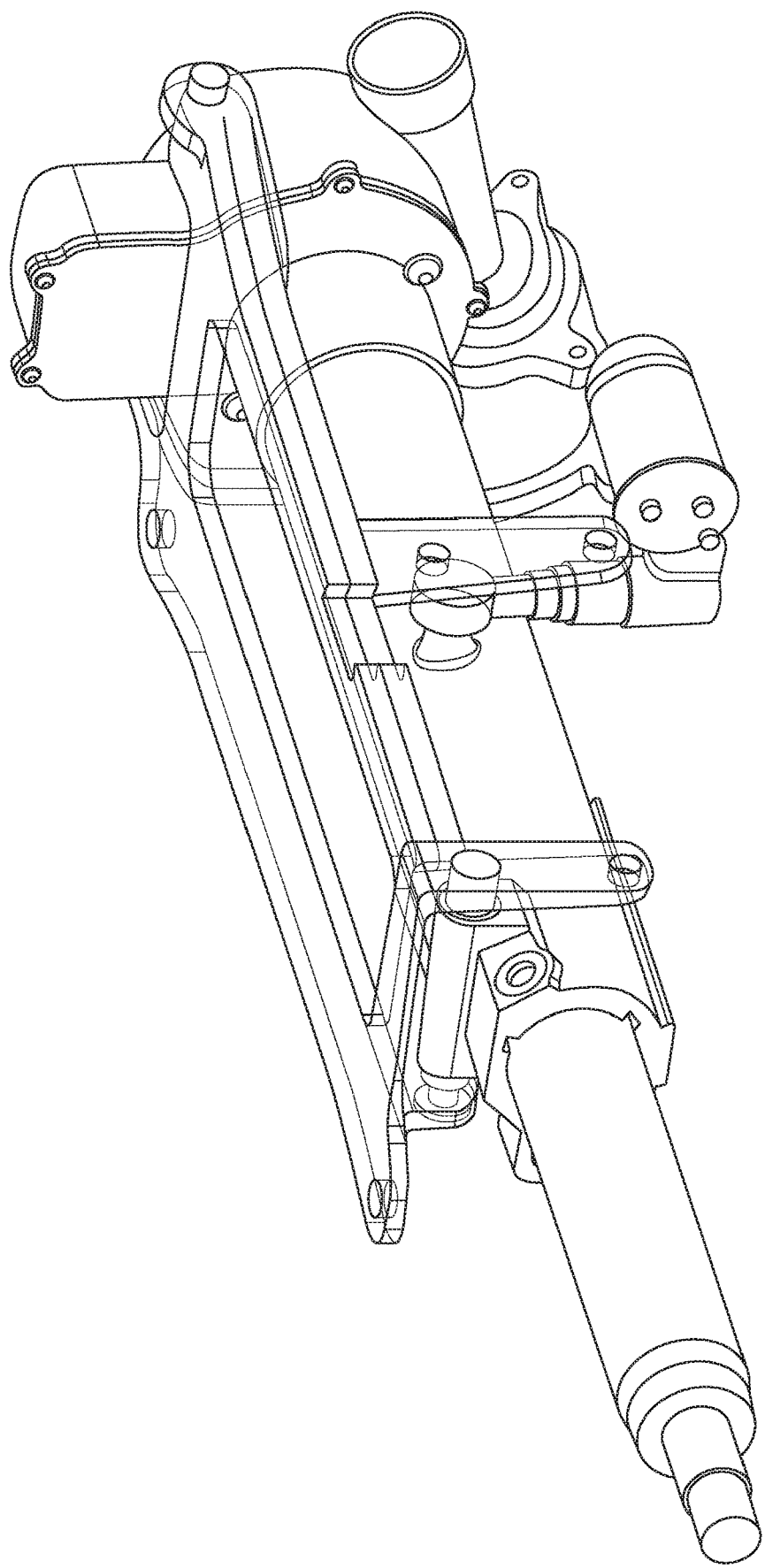
FIG. 1 is an isometric view of a first type of conventional rake adjustment mechanism for a steering column.
Figure 2:
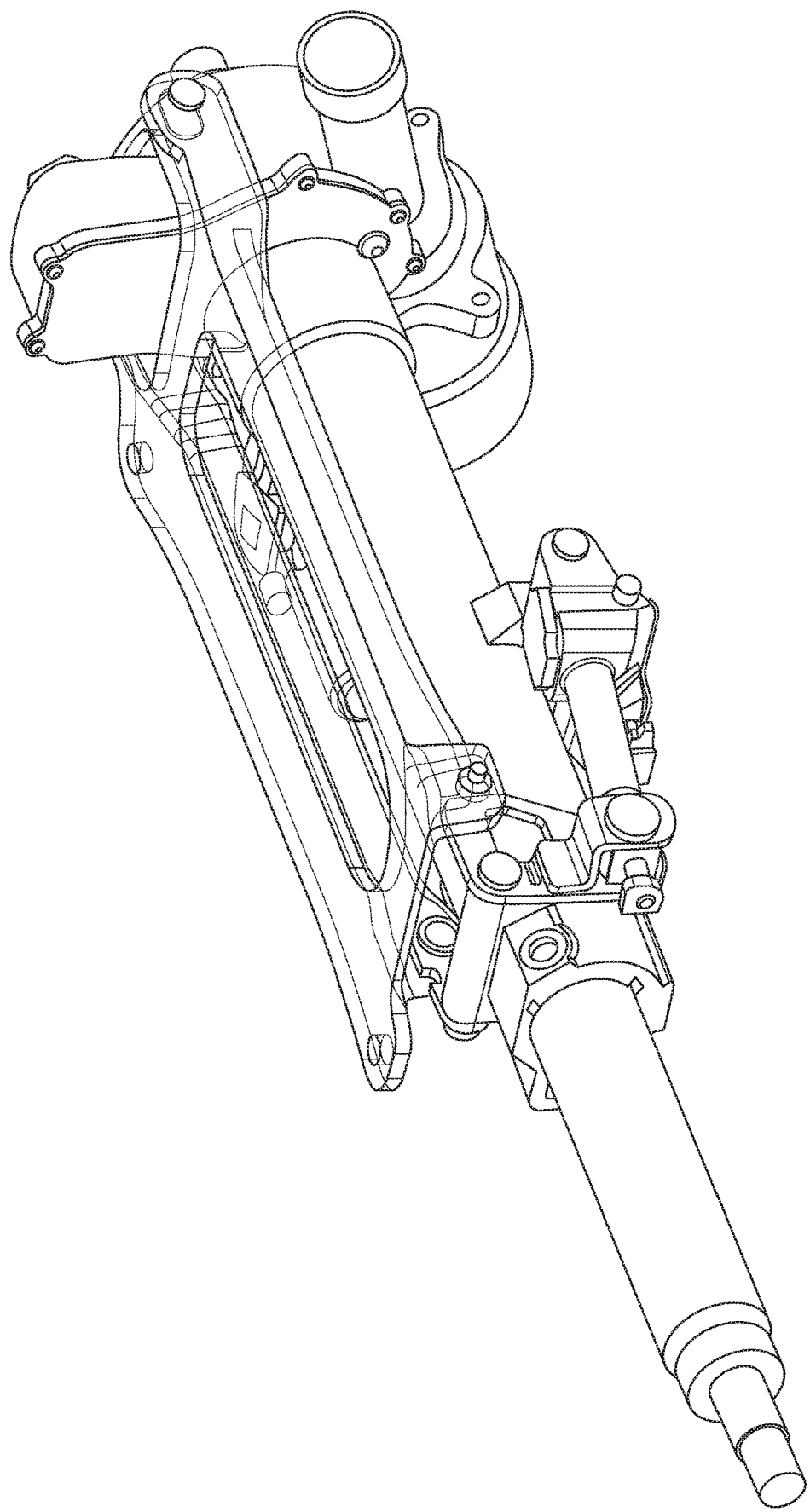
FIG. 2 is an isometric view of a second type of conventional rake adjustment mechanism for a steering column.

Compared to the conventional designs of FIGS. 1 and 2, the embodiments disclosed herein can provide a more compact solution to actuate the rake adjustment of the steering column. The overlap of the slots and the electrical actuator can be located very close to, or even inside, and along the jacket of the steering column.

Any feature, element, component or advantage of any one embodiment can be used on any of the other embodiments.

While the various embodiments have been described in detail in connection with only a limited number of examples, it should be readily understood that they are not limited to such disclosed versions. Rather, the embodiments can be modified to incorporate any number of variations, alterations, substitutions or equivalent arrangements not heretofore described, but which are commensurate with the spirit and scope of this disclosure. Additionally, while various embodiments have been described, it is to be understood that aspects may include only some of the described features and components. Accordingly, the embodiments are not to be seen as limited by the foregoing description.

Having thus described the invention, it is claimed:

1. A system for adjusting a rake of a steering column, the system comprising:
    a rake actuator;
    a first bracket defining a first slot;
    a second bracket defining a second slot, the second bracket fixed in a stationary position relative to the first bracket, the first and second slots oriented at different angles, but partially aligned; and
    a cam follower operatively coupled to the rake actuator, the cam follower having an arm extending through the first slot and the second slot, wherein translation of the cam follower adjusts the angular position of the first bracket,
    wherein the first bracket defines a third slot on an opposite side of the cam follower relative to the first slot, the second bracket defining a fourth slot on an opposite side of the cam follower relative to the second slot, the third slot and the fourth slot oriented at different angles, but partially aligned, the cam follower having a second arm extending through the third slot and the fourth slot.

2. The system of claim 1, wherein the rake actuator is configured to actuate the cam follower along a longitudinal axis of the steering column.

3. The system of claim 1, wherein the first bracket is a compression bracket.

4. The system of claim 1, wherein the second bracket is a rake bracket.

5. The system of claim 1, wherein the different angular orientation of the first slot and the second slot facilitates upward or downward movement of the first bracket.

6. A system for adjusting a rake of a steering column, the system comprising:
    a rake actuator;
    a first bracket defining a first slot;
    a second bracket defining a second slot, the second bracket fixed in a stationary position relative to the first bracket, the first and second slots oriented at different angles, but partially aligned; and
    a cam follower operatively coupled to the rake actuator, the cam follower having an arm extending through the first slot and the second slot, wherein translation of the cam follower adjusts the angular position of the first bracket.

7. A system for adjusting a rake of a steering column, the system comprising:
    a rake actuator;
    a first bracket defining a first slot;
    a second bracket defining a second slot, the second bracket fixed in a stationary position relative to the first bracket, the first and second slots oriented at different angles, but partially aligned; and
    a cam follower operatively coupled to the rake actuator, the cam follower having an arm extending through the first slot and the second slot, wherein translation of the cam follower adjusts the angular position of the first bracket, wherein the rake actuator is mounted on a longitudinal axis of the steering column.

8. The system of claim 7, wherein the rake actuator extends in an axial direction that is axially aligned with the longitudinal axis of the steering column.

* * * * *